United States Patent Office 2,790,015
Patented Apr. 23, 1957

2,790,015

CATALYTIC DEHYDROGENATION OF HYDROCARBONS

Saul Gerald Hindin, Wilmington, Del., assignor to Houdry Process Corporation, Wilmington, Del., a corporation of Delaware No Drawing. Continuation of application Serial No. 267,195, January 18, 1952. This application October 13, 1954, Serial No. 462,100

1 Claim. (Cl. 260—668)

The present invention relates to catalytic dehydrogenation and is particularly concerned with an improved process for effecting dehydrogenation of hydrocarbons without accompanying side reactions, such as cracking and/or polymerization, which tend to produce carbonaceous deposit in the catalyst ("coke") necessitating frequent periodic regeneration. By the present invention, moreover, readily available and inexpensive material is employed as dehydrogenation catalyst, which catalyst retains its activity over comparatively long periods.

Various forms of alumina, including particularly gamma alumina and usually in partially hydrated form, have heretofore been known and extensively employed as a base or carrier for dehydrogenation catalyst, the alumina having incorporated therewith one or more active metals or other metal oxides promoting dehydogenation activity. Familiar catalysts of this kind employing alumina in major amount include the noble metal catalysts, and those comprising chromium and/or molybdenum oxide. Alumina itself has been generally regarded as relatively inert catalytically, and in fact when prepared in the usual manner and used under conditions customarily employed for catalytic dehydrogenation, the known forms of alumina do not display any catalytic activity in promoting dehydrogenation.

As a result of extensive investigation it has now been found that alumina carefully dried at elevated temperature so that it is substantially free of water does have dehydrogenation activity when used under substantially anhydrous conditions. In accordance with the invention dehydrogenation of hydrocarbons is carried out with a catalyst consisting essentially of dry alumina prepared by drying an aluminum hydrate at a sufficiently high temperature, generally in the order of at least 1200° F., in an environment maintained substantially free of moisture accumulation. To maintain the required environment during drying a stream of dried gas is passed over the catalyst at the required temperature and at a rate sufficient to remove in the stream the water released from the alumina; or the drying may be effected in vacuo. The temperature of drying should be below that at which substantial sintering of the alumina occurs, which is generally found to happen at about 1700–1800° F.

The dried catalyst, thus prepared, should be protected from moisture prior to and during use even to the extent of having the hydrocarbon feed stock as dry as possible.

The effect of relatively small quantities of water on the hydrogen-transfer activity of alumina is shown by the following experiments, wherein gamma-alumina (Harshaw) dried in vacuo at the several reported temperatures was contacted for one hour at approximately 300° F. with about twice its weight of isobutane-1-d; in certain of the runs, after drying water was added back to the alumina about equal to 0.43% by weight of alumina. The results are tabulated below:

| Drying Temp., ° F. | Water Added | Percent Exchange Deuterium |
|---|---|---|
| 600 | No | 0 |
| 600 | Yes | 0 |
| 975 | No | 1 |
| 975 | Yes | 0 |
| 1,200 | No | 11 |
| 1,200 | Yes | 0 |

The above results are directly contrary to what would be expected from the known effect of water on the behaviour of silica-alumina (see R. C. Hansford: Mechanism of Catalytic Cracking; Ind. & Eng. Chem. (1947), vol. 39, p. 849).

In another series of experiments gamma alumina dried for one hour in vacuo at the indicated temperature and then cooled to room temperature, was reacted with a heavy methane composition ($CD_4$) for one hour at 300° C., with the following results:

| Drying Temp., ° F. | $H_2O$ Added, Wt. Percent $\gamma$-$Al_2O_3$ | Product Gas | | |
|---|---|---|---|---|
| | | $CD_4$ | $CD_3H$ | $CD_2H_2$ |
| Charge Gas ($CD_4$) | | 89.0 | 4.9 | 2.7 circa |
| 600 | None | 90.1 | 6.0 | 0.3 |
| 600 | 0.43 | 90.7 | 5.5 | |
| 975 | None | 56.4 | 29.5 | 10.5 |
| 975 | 0.43 | 90.8 | 5.0 | 0.3 |
| 1,200 | None | 69.4 | 20.4 | 7.3 |
| 1,200 | 0.1 | 82.8 | 11.9 | 1.7 |

The quantity of residual water (ignition loss) contained in carefully dried alumina at various temperatures is given below. The samples were dried in vacuo at the indicated temperature and ignition loss determined by blast lamp ignition in platinum:

| Drying Temp., ° F. | Wt. Percent Loss on Ignition |
|---|---|
| 600 | 0.66±0.1 |
| 975 | 0.42 |
| 1,200 | 0.33 |
| 1,400 | 0.14 |
| 1,600 | 0.0 |

The effect of very small quantities of water on the dehydrogenation activity of alumina was further confirmed by a series of experiments in the conversion of methylcyclohexane at atmospheric pressure and the indicated run temperatures; from which it appears that for this reaction there is an optimum dehydration temperature between 1400° and 1700° F.

| γ-Al₂O₃ Treatment | Run Temp., °F. | Products, Wt. Percent | | Gas Grav. | H₂ Produced, Mol Percent Charge |
|---|---|---|---|---|---|
| | | Toluene | Gas | | |
| 1. 1,400° F., vacuum, overnight, then cooled in dry N₂. | 932 | 6.7 | 1.27 | 0.23 | 0.180 |
| | | 7.5 | 1.24 | 0.22 | 0.190 |
| 2. Heated to run temp. in room air for several hours. | 932 | 0 | 0.77 | 1.10 | 0.024 |
| 3. 932° F., vacuum, 1.5 hours. | 932 | 2.2 | 0.76 | 1.09 | 0.024 |
| 4. 1,600° F., vacuum and cooled in dry N₂. | 932 | 8.2 | 1.35 | 0.21 | 0.222 |
| 5. 1,750° F., vacuum and cooled in dry N₂. | 932 | 4.9 | 0.91 | 0.30 | 0.105 |
| 6. Same as 1 | 1,050 | 16.2 | 2.80 | 0.20 | 0.478 |
| 7. Same as 4 | 1,050 | 17.4 | 2.80 | 0.19 | 0.497 |

As measured by the hydrogen production, it will be seen that the dried alumina is in the order of 8 or more times as active as that containing equilibrium amount of water at the run temperature. Alumina containing relatively small amount of water in the order of less than 0.4% by weight of the catalyst was found to have significant activity for dehydrogenation, and in some instances, it was observed, that minute amounts of water, as below about 0.1 to 0.2% by weight of the alumina appeared beneficial.

While dried alumina containing less than 0.4% $H_2O$ was shown to be active in dehydrogenation and hydrogen transfer reactions, this catalyst does not tend to promote accompanying side reactions such as isomerization or cracking. The hydrogen produced in dehydrogenation is therefore of high purity and relatively free of light hydrocarbons.

For the production of active catalysts composed of alumina one may start with commercial activated alumina or with ordinarily dried precipitates of hydrated alumina or aluminum hydroxide. Thus, alum or other aluminum salts may be precipitated by reaction with ammonium or alkali metal hydroxide or carbonate; or alkali metal aluminates may be reacted with dilute mineral acid. The alumina is carefully dehydrated at elevated temperature in an atmosphere from which the released water is continuously removed by vacuum or by a moving current of the drying gas which may be air, nitrogen, hydrogen or other gas in pre-dried condition.

In operation of dehydrogenation processes employing the specially prepared catalyst no change is required in the usual operating conditions best suited for the nature of the hydrocarbon charge being treated. For example, in the production of corresponding aromatics by dehydrogenation of particular cyclohexanes or mixtures thereof, the operation may be carried out at temperatures in the range of about 800–1050° F. and at pressures of about 100 to 750 pounds per square inch; similar operating conditions apply in the reforming of naphtha for production of gasoline of improved octane rating where the principal reaction is that of dehydrogenation of cyclohexane type compounds.

The dehydrated alumina may also be used in any of the various other known processes for dehydrogenation of hydrocarbons as a substitute for catalysts heretofore employed, including for instance the dehydrogenation of lower molecular weight acyclic hydrocarbons in the production of butylene and/or butadiene as well as in the treatment of higher molecular weight compounds, for instance through $C_{10}$ or $C_{12}$, to corresponding olefins. No change in the customary operating conditions as to temperature and pressure are required.

Since the dehydrogenation-promoting function of the catalyst is highly selective and such side reactions as may tend to form significant quantities of coke are avoided, the catalyst can be employed over long on-stream operating periods without requiring regeneration. Moreover, the catalyst is thermally stable even at regeneration temperatures going up to about 1500–1600° F., so that if regeneration is desired after a sufficiently long operating period, it can be practiced without untoward effect on the catalyst.

Example

In a typical operation under the preferred conditions hereinbefore described, the catalyst is prepared by subjecting commercial activated alumina pellets (Harshaw) to treatment with 10% acidic aqueous solution for 1 hour, decanting, and repeating the treatment for another hour with fresh acid of the same concentration, each treatment being with an amount of acid just sufficient to cover the pellets. The treated pellets are washed in water a number of times, dried at 200° F. and calcined in air at 1050° F.

The calcined pellets are placed in a reactor capable of being pressure-sealed and dehydrated by passing dried air thereover at about 1400° F. for 4 hours to bring the ignition-moisture content of the catalyst to below about 0.2% $H_2O$. The air is then swept out with dry heated nitrogen and the vessel brought to operating pressure thereafter by the admission of hydrogen.

An East Texas naphtha of 60.5° API gravity and boiling over the approximate range of 180–220° F. is run into the reaction vessel while that vessel is being brought up to operating pressure and such naphtha is converted under run conditions including a total pressure of 300 pounds per square inch gauge, at a temperature of 950° F. and at a liquid space velocity of 3 volumes of oil per hour per volume of catalyst, hydrogen being admitted with the naphtha charge at the rate of 4 moles hydrogen per mole of hydrocarbon.

Reference is made to the application of Saul Gerald Hindin, Serial No. 267,195, filed January 18, 1952, now abandoned of which this is a continuation.

Obviously many modifications and variations of the invention as hereinbefore set forth may be made without departing from the spirit and scope thereof and therefore only such limitations should be imposed as are indicated in the appended claim.

What is claimed is:

The method of dehydrogenating a normally liquid hydrocarbon which comprises the steps of subjecting the hydrocarbon to rigorous drying conditions to prepare a substantially anhydrous feed, and passing the vapors of said anhydrous feed in the presence of a molar excess of hydrogen at a temperature in the range of 800–1050° F. and a pressure of 100–750 pounds per square inch over a high surface area catalyst consisting essentially of non-sintered gamma alumina and free of effective quantities of other catalytic components, said alumina having been prepared from an activated alumina by leaching the activated alumina with dilute aqueous acid and washing and drying the acid leached activated alumina to restore it to the moisture content of activated alumina, and thereafter subjecting the alumina to a special drying treatment at about 1400° F. for about four hours, said special drying treatment being conducted in an anhydrous atmosphere from which the water released from the alumina is continuously removed by a stream of dried air, whereby the gamma alumina contains some water but less than 0.2% water by weight.

References Cited in the file of this patent

UNITED STATES PATENTS

| | | |
|---|---|---|
| 2,182,431 | Groll | Dec. 5, 1939 |
| 2,406,420 | Weiser | Aug. 27, 1946 |